Figure 4:
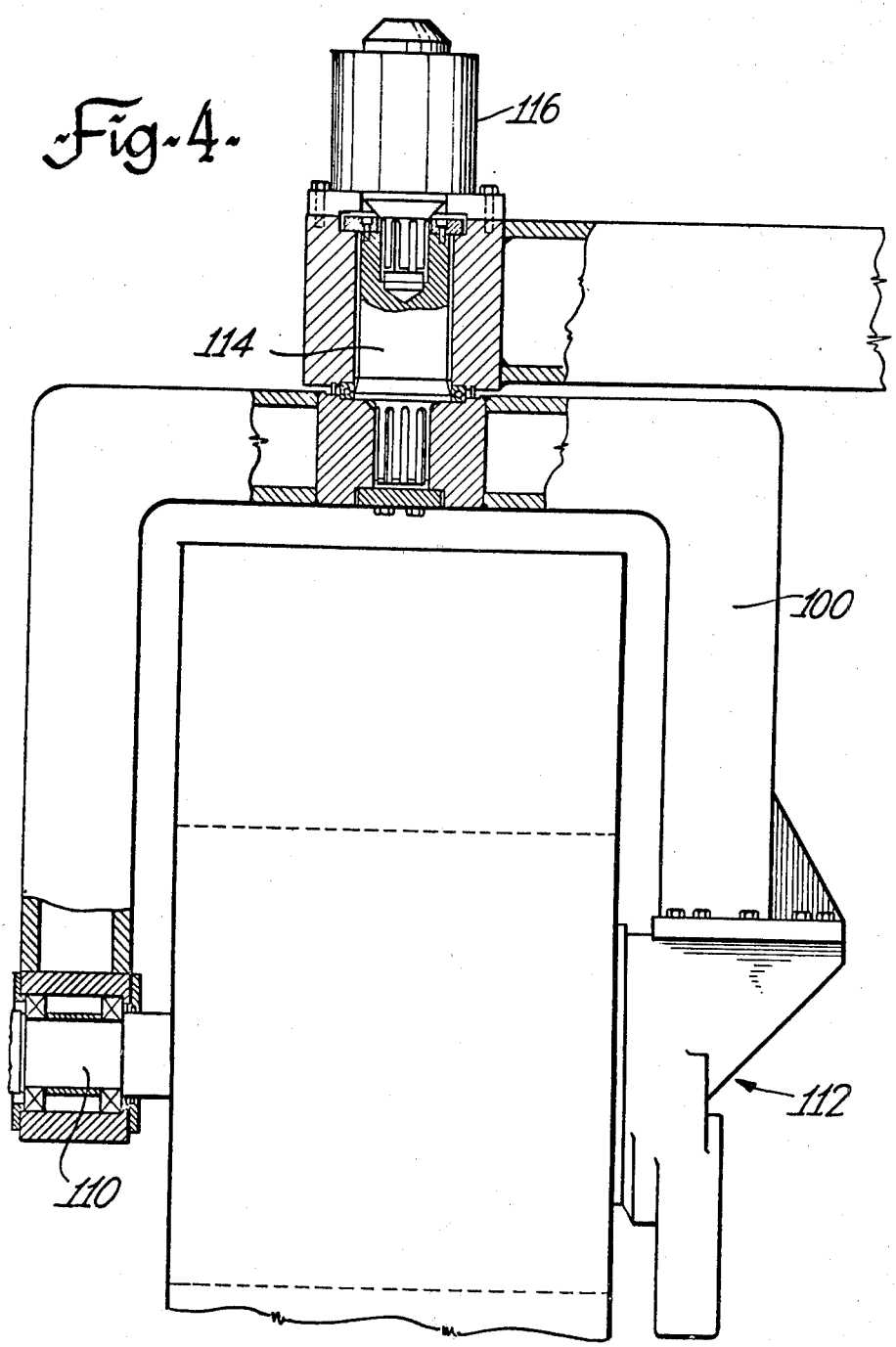

United States Patent [19]
Larson

[11] 3,989,074
[45] Nov. 2, 1976

[54] MULTIPLE CUT FELLER

[76] Inventor: Robert W. Larson, Box 1148, Thunder Bay, Ontario, Canada, P7C 4X9

[22] Filed: May 12, 1975

[21] Appl. No.: 576,333

[30] Foreign Application Priority Data
May 16, 1974 Canada ............................... 200151

[52] U.S. Cl. .............................. 144/3 D; 56/327 A; 83/368; 144/34 E
[51] Int. Cl.² ...................... A01G 23/08; B26D 5/02
[58] Field of Search ........... 56/327 A; 144/2 Z, 3 D, 144/34 R, 34 E, 309 AC; 83/364, 368, 370, 371, 928

[56] References Cited
UNITED STATES PATENTS
2,709,330  5/1955  Lafferty et al. .................... 56/327 A

*Primary Examiner*—Othell M. Simpson
*Assistant Examiner*—W. D. Bray
*Attorney, Agent, or Firm*—Stanley E. Johnson

[57] ABSTRACT

An automatic tree felling machine is provided. In one embodiment, the machine consists of a self-propelled vehicle having a plurality of automatically operated felling heads, a grapple bunk for skidding felled trees and a plurality of transfer grapples for transferring trees from the felling heads to the bunk. Each felling head is mounted on a transversely extending felling head track that also serves as a sensing means. As the vehicle moves forwardly, the felling head tracks are contacted by trees, causing the tracks to retract towards the machine. As each track retracts, the associated felling head is actuated to travel in a horizontal direction along the track towards the tree engaged with the track while simultaneously travelling downward. Subsequently, the tree contacts a control arm in the felling head which then descends vertically to the stump and fells the tree. The felling head then retracts to its original position where a transfer grapple lifts the tree from the felling head and deposits it on the skidding bunk. Also disclosed are two embodiments employing single felling heads and delimbers. In one of these embodiments, the sensing means is photoelectric.

19 Claims, 10 Drawing Figures

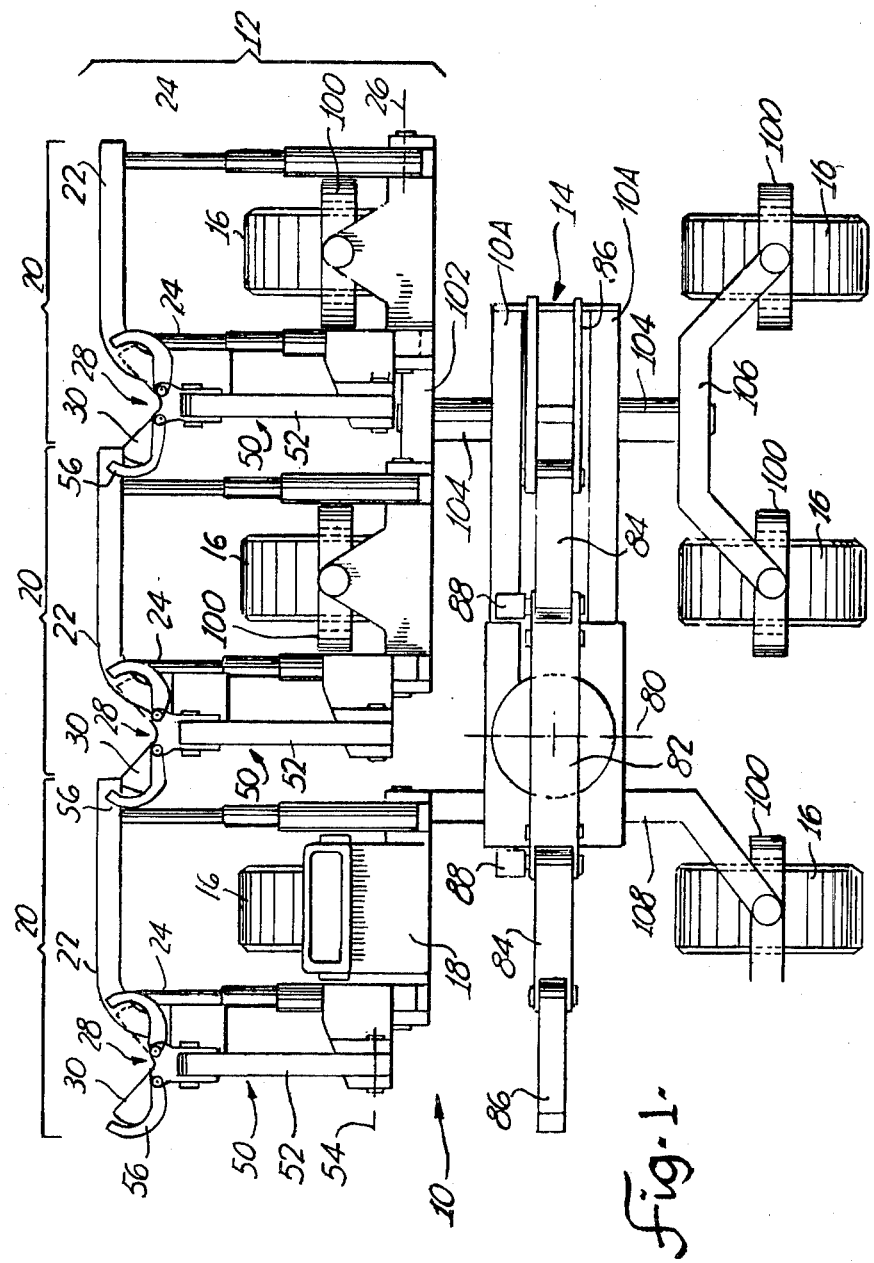

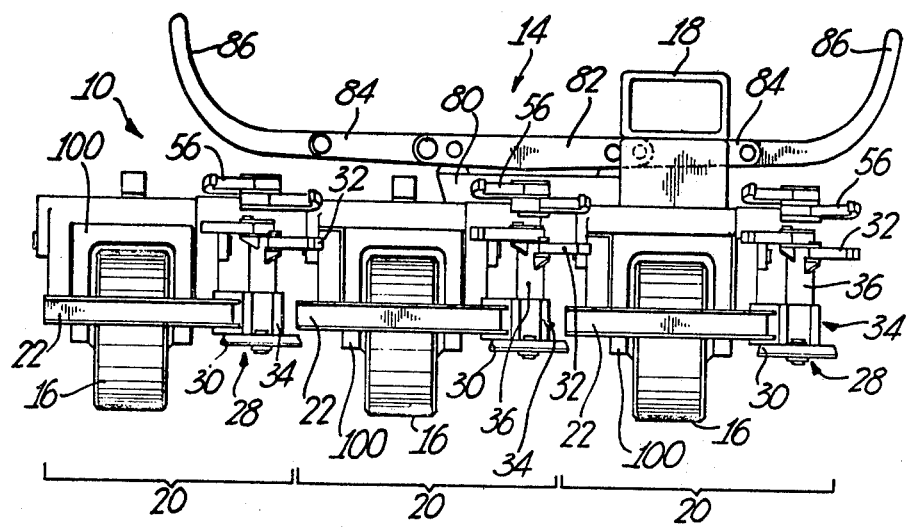
Fig-3-
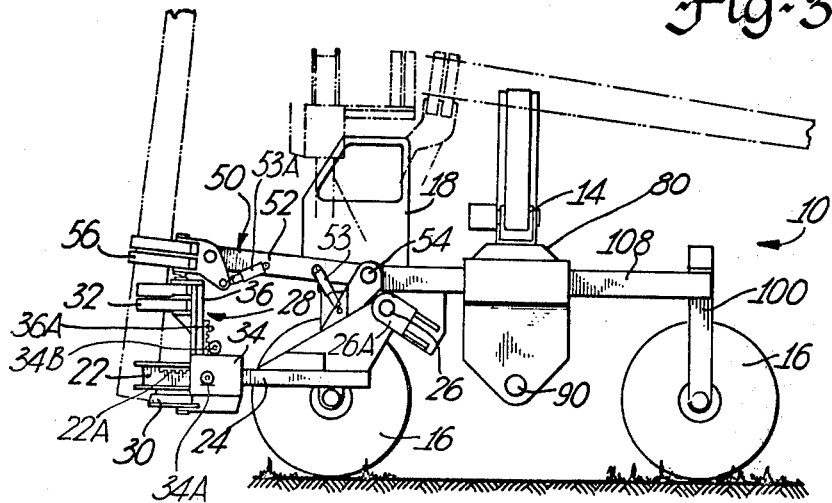
Fig-2-

MULTIPLE CUT FELLER

The present invention relates to tree felling and more particularly to mechanical tree felling apparatus.

Many tree fellers have been proposed in the past, some operative only to fell trees, others operative to fell and process trees (i.e. harvesters) and some operative to fell and forward trees (i.e. skidders). All of these prior mechanisms are arranged to fell one tree at a time normally by means of a felling head mounted on the end of a boom which is manipulated by a machine operator.

The present invention is directed to an automatic felling machine that proceeds along a path through a forested area and automatically fells trees encountered as it so moves, without the operator having to manipulate a boom to position a felling head relative to a tree to be cut.

Thus, in accordance with the present invention there is provided a tree felling apparatus comprising: a mobile vehicle; sensing means on said vehicle for sensing the presence of a standing tree at the forward end of the vehicle as the vehicle moves in a forward direction; felling means movably mounted on said vehicle; and means operable in response to sensing of a tree by said sensing means to move said felling means into engagement with the tree sensed by said sensing means.

In one embodiment the present apparatus includes a plurality of automatically operated fellers spaced across its forward end. This enables the machine to clear cut along a cutting face through a forested area at a very rapid rate without the need for precise manual control of a boom on the part of the operator.

In another, similar embodiment of the present invention, the machine has a plurality of automatically operated felling heads, a grapple bunk for skidding felled trees and a plurality of transfer grapples for transferring trees from the felling heads to the bunk. In operation, the felling heads move ahead of the vehicle at a position approximately 30 inches above ground level. Each felling head is mounted on a transversely extending felling head track that also serves as the sensing means or sensing member. When a tree contacts a felling head track on the machine, the track retracts, actuating the associated felling head to travel in a horizontal direction along the track towards the tree. Subsequently, the tree contacts a control arm in the felling head which then descends vertically to the stump and severs the tree from its roots. While severing takes place, the vehicle is moving forwardly, conveniently at a speed of up to one mile per hour.

After the tree has been severed, the felling head moves horizontally and vertically back to its starting position where a transfer grapple clamps and lifts the full tree from the felling head and deposits it on the skidding bunk of the machine.

Each head continues to operate in this manner until approximately six cords are accumulated in the bunk. The operator then closes the bunk grapple to form a bundle from the trees in the bunk, turns the wheels of the machine 90° and moves out of the cutting face to deposit the cut trees in piles in a convenient location.

During the operation the operator has one task and that is to steer and control the speed of the machine.

In another embodiment, the apparatus is a harvester and includes a single automatically operated feller mounted on a vehicle that also carries a delimber. The feller, after felling a tree, delivers it to the delimber for processing.

In various embodiments the sensing means may be a retractable felling head track, a control arm for contacting trees as the machine moves forwardly or a photoelectric sensor. In embodiments using a control arm or photoelectric sensor, the felling head track is fixed to the vehicle and is not retracted. This is advantageous for those embodiments employing small vehicles.

Figure 5:
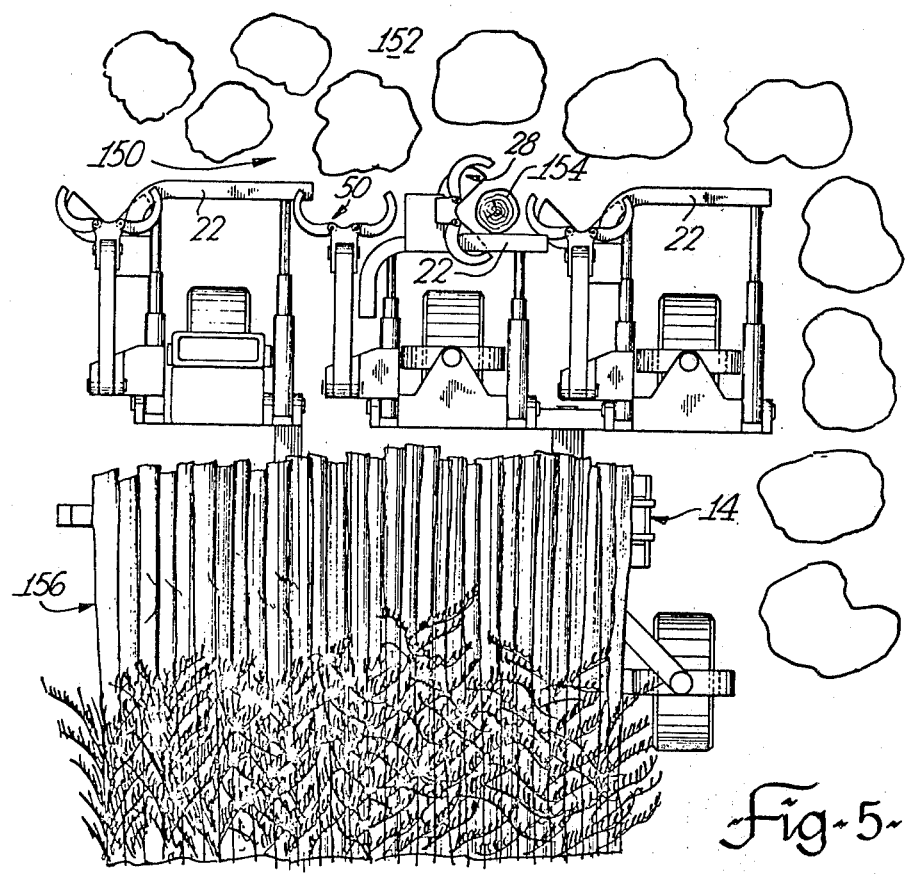
Figure 6:
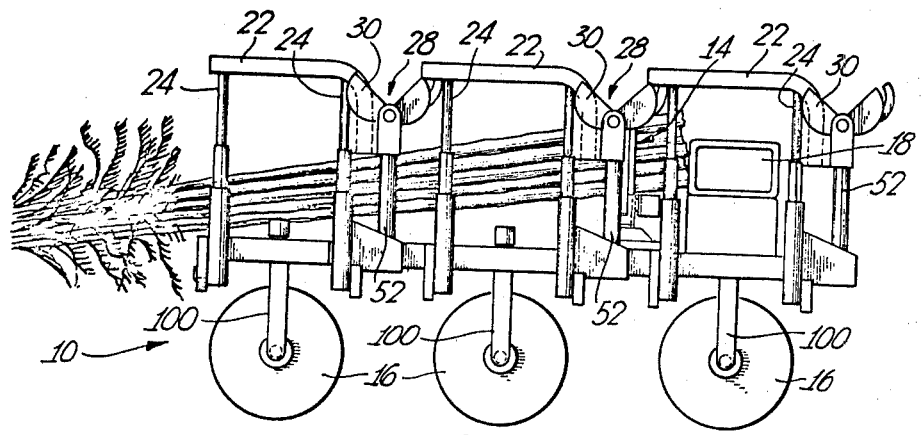
Figure 7:
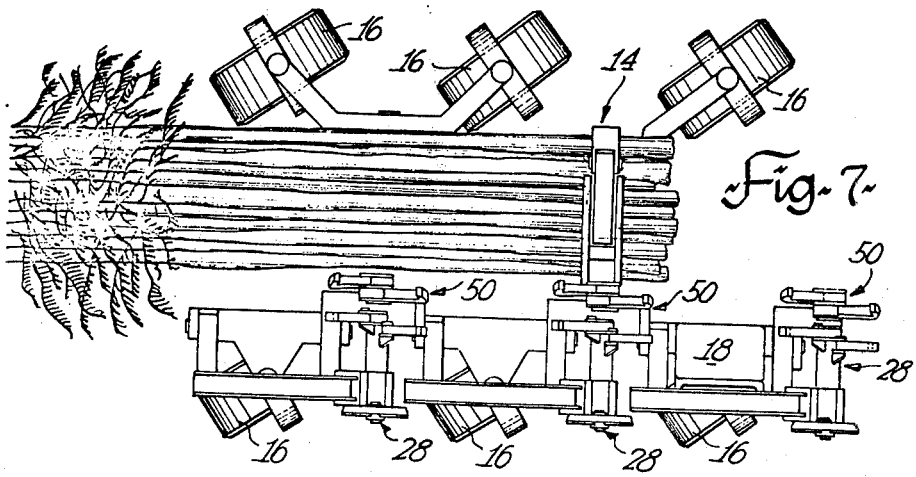
Figure 8:
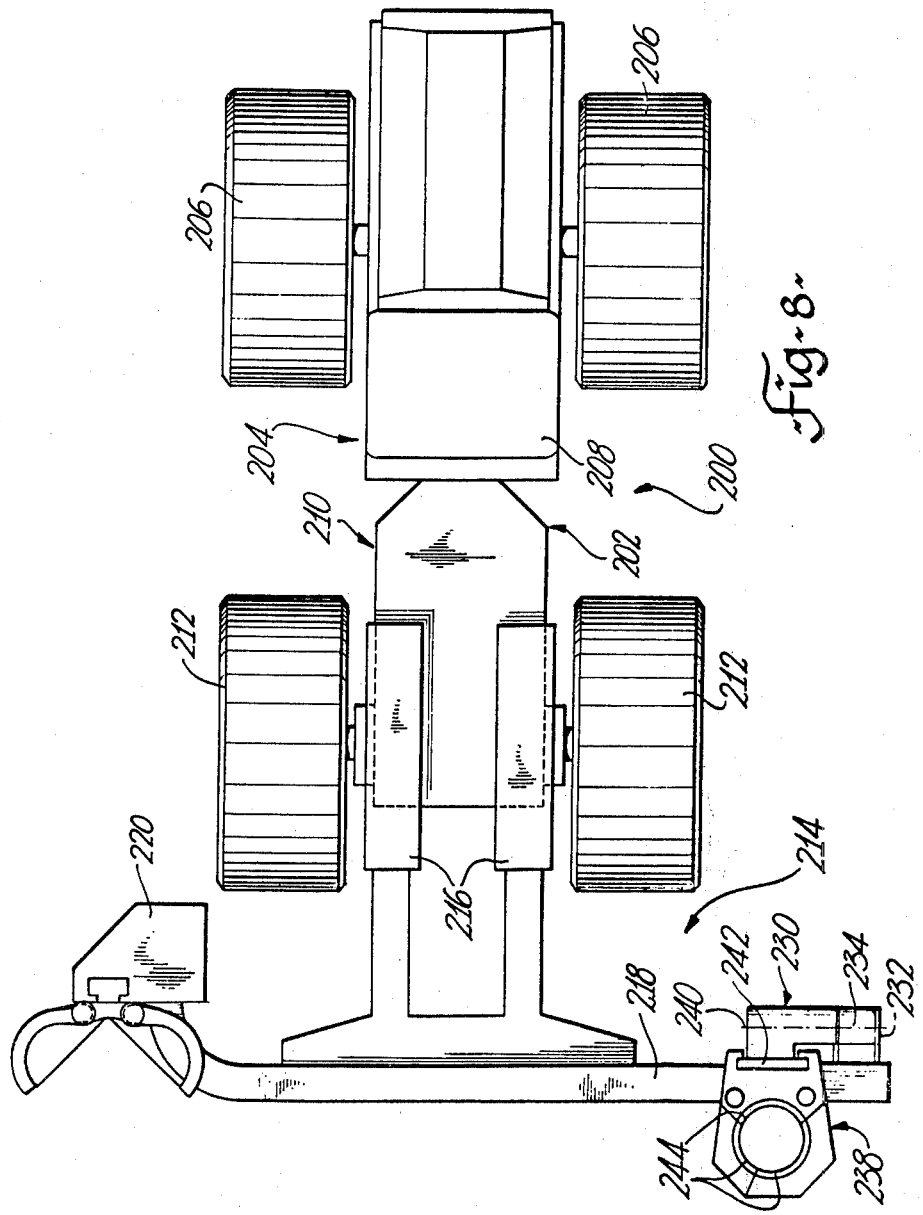
Figure 9:
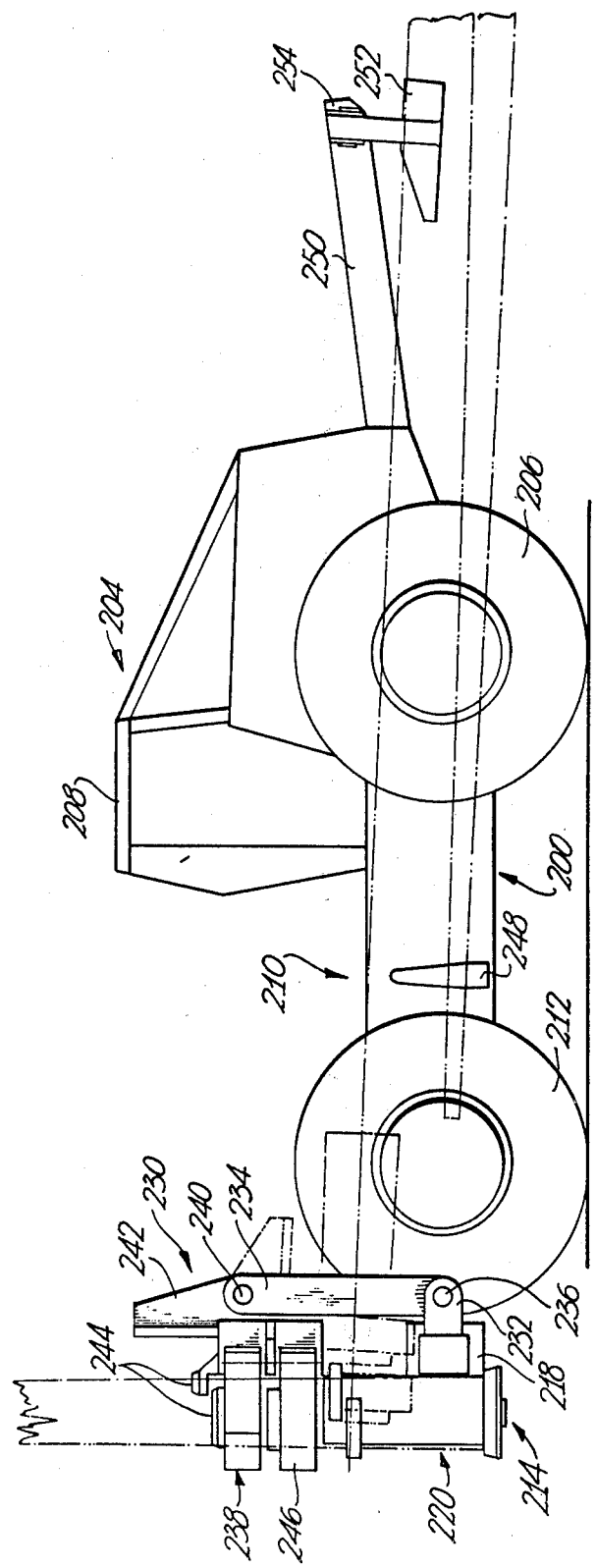
Figure 10:
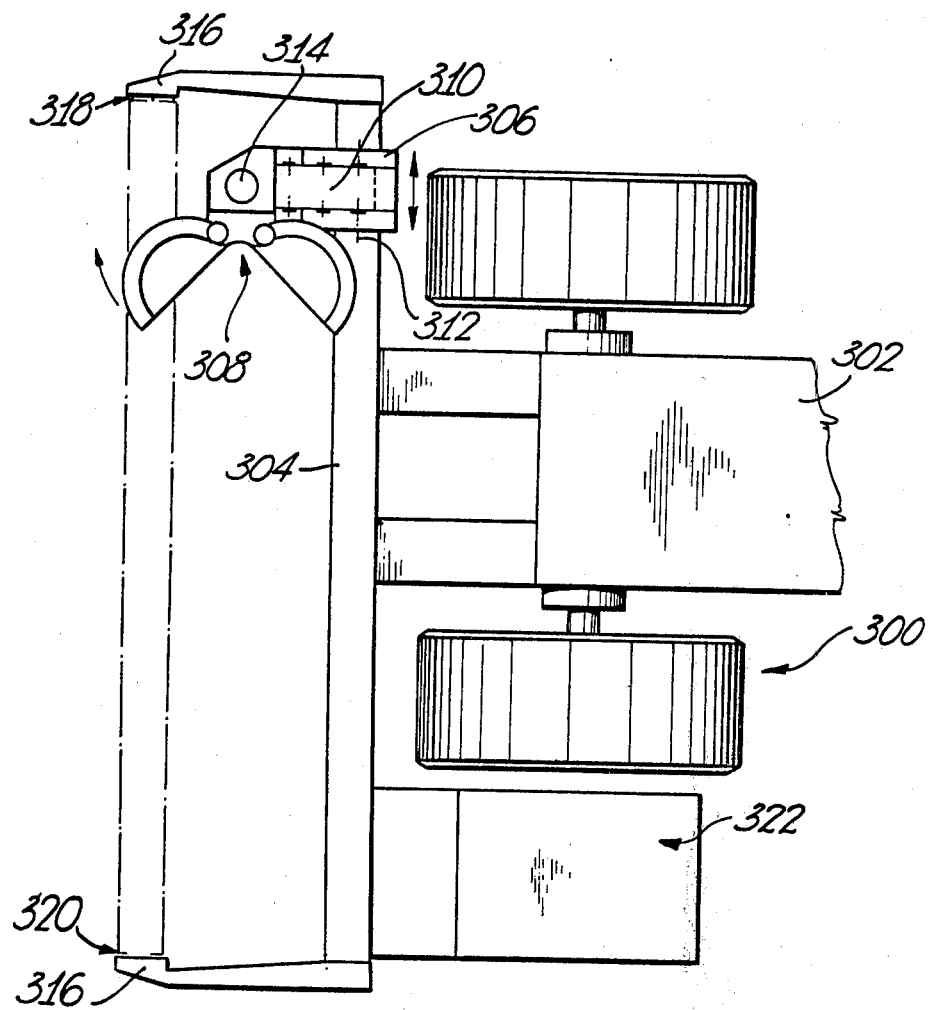

In drawings which illustrate embodiments of the present invention:

FIG. 1 is a plan view of a felling machine in accordance with the present invention;
FIG. 2 is a side elevation of the machine of FIG. 1;
FIG. 3 is a front elevation of the machine of FIG. 1;
FIG. 4 is an elevational view partially in cross-section of a wheel mounting arrangement;
FIG. 5 is a schematic plan view showing cutting operations with the machine of FIGS. 1 to 3;
FIG. 6 is a front elevation of the machine of FIGS. 1, 2 and 3 when skidding;
FIG. 7 is a schematic plan showing a skidding operation with the machine of FIGS. 1 to 3;
FIG. 8 is a plan view of a harvester in accordance with the present invention;
FIG. 9 is an elevational view of the harvester of FIG. 8; and
FIG. 10 is a plan view of another harvester embodiment in accordance with the present invention.

Referring to FIGS. 1, 2 and 3, there is illustrated a tree felling machine 10 constructed in accordance with the present invention. The machine includes a felling section 12 at its forward end and a bunk 14 located rearwardly of the felling section. The machine has six wheels 16 on which it travels and a cab 18 at the forward left hand side for the operator.

The felling section 12 of the illustrated machine includes three automatic fellers 20. As all three fellers are identical, only one will be described in detail, it being understood that the other two fellers 20 have the same construction and operation. Also it will be obvious any number of fellers 20 may be used dependent upon the desired capacity of the machine.

Each feller 20 includes a felling head track 22 mounted on the forward end of the machine and extending transversely thereof. The track 22 is mounted on the forward end of the mcahine by a pair of transversely spaced apart and longitudinally extending hydraulic actuators 24 which are pivotally connected at their rearward ends to the felling machine 10 so as to pivot about a horizontal axis 26. Tilting of the arms may be effected in any convenient manner such as hydraulic cylinders or a rotary actuator such as, for example, the unit designated 26A. As can be seen most readily from FIG. 1, the track 22 curves rearwardly towards the machine 10 at its left hand end.

A felling head 28 is slidably mounted on the track 22 for reciprocal movement therealong. The felling head includes a shear 30 and a grapple 32 mounted respectively on opposite ends of a vertical beam 36. The vertical beam 36 is slidably mounted for vertical movement in a mounting structure 34 which in turn is mounted on the track 22 for sliding movement in a horizontal direction along the track 22. Movement of the head 28 along the track 22 is effected by a hydraulic motor 34A mounted on the structure 34 driving a pinion which meshes with a rack 22A on the track 22. The mounting structure 34 has a further hydraulic motor 34B mounted thereon driving a pinion which meshes with a rack 36A on beam 36 to raise and lower the shear 30 and grapple 32 with respect to the track 22. The operative elements in the mounting structure 34 for raising and lowering the shear and grapple and moving the same along the track, i.e. hydraulic motors, are actuated in response to pressure built up in the hydraulic actuators 24 when the track 22 is engaged by a tree and the actuators 24 retract as the machine moves forwardly. The arrangement is such that when a tree is engaged by the track 22, the pressure build up acts to drive the felling head 28 along the track 22 and to lower the felling head with respect to the track 22 as it so moves. As the felling head traverses the left hand curved portion of track 22, it swings through 90° to the right as viewed in FIG. 1 so that any tree engaged with the track 22 will be received in the open mouth of the felling head 28. When the felling head engages a tree engaged by track 22, the tree contact a control arm (not shown) in the base of the shear and the felling head descends vertically to the stump and severs the tree. The track 22 is then free to move to its forward normal position and the felling head is elevated and returned along track 22 to its normal position as illustrated in FIG. 1.

The three fellers 20 are arranged to extend across respective portions of the front face of machine 20 so that every part of the front face is traversed by a feller.

Mounted on the machine 10 are three transfer mechanisms 50 having respective booms 52 pivotally connected to the machine 10 for pivotal movement about a horizontal transverse axis 54 by a hydraulic cylinder 53. Each boom 52 has a hydraulically operated grapple 56 fixed or pivotally attached at its forward end. In the embodiment illustrated the grapple is pivotally attached and tilted by a hydraulic cylinder 53A. In its normal position of the boom 52 the grapple 56 is positioned directly above the felling head 28 in its normal position. When, after shearing a tree, the felling head 28 returns with the tree to its normal position, the grapple 56 closes on the tree, the felling head 28 opens and the transfer mechanism 50 lifts the tree from the felling head and swings it through a vertical arcuate path and deposits it on the bunk 14 at the rearward end of the machine. The bunk 14 is preferably of the type having a knife edge to impale the surface of the tree so that the trees are at least partially secured thereto when placed thereon by the transfer mechanism 50.

The bunk 14 is mounted on a frame 10A of machine 10 by a turntable 80 so as to pivot about a vertical axis. As most clearly illustrated in FIG. 3, the bunk has a center section 82, a pair of inner grapple arms 84 and a pair of outer grapple arms 86. Rotary hydraulic actuators 88 (only two are shown) are operative to open and close the grapple arms of the bunk.

As previously mentioned, the machine 10 is supported by six wheels 16. Each wheel is mounted in a fork 100 which is in turn mounted on the machine so as to enable steering both in the normal forward-rearward direction and in the orthogonal or sideways direction. The right hand and center front forks 100 are mounted on transverse walking beam 102 which in turn is pivotally mounted on the vehicle at a position between the right hand and center fellers 20 for pivotal movement about the longitudinal axis of a beam 104. The right hand and center rear forks 100 are similarly mounted on the respective opposite ends of a transverse walking beam 106 which in turn is pivotally mounted on beam 104. The beam 104 is secured to the frame 104A. The left hand front and rear wheels 16 are mounted on the respective opposite ends of a longitudinal walking beam 108 which is pivotally mounted on frame 10A to pivot about an axis 90 transverse to beam 104.

As can be most readily seen from FIG. 1, the right hand and center fellers 20 are themselves carried by the walking beam 102 and the left hand feller 20 is carried by the walking beam 108. Thus, the associated felling heads 28 maintain a substantially constant elevation above the ground surface which the machine 10 is traversing, 30 inches in this preferred embodiment, even when that surface is very uneven.

The particular wheel mounting arrangement used is illustrated in FIG. 4 from which it will be seen that each wheel 16 is mounted on a shaft 110 journalled to one arm of the fork 100 and coupled to the other arm of the fork 100 by a drive unit 112. Drive unit 112 is a hydraulic motor and gear reduction unit which operates to drive the wheel 16. The top of fork 100 is fixed to a shaft 114 journalled to one of the walking beams 102, 106 and 108 depending upon the particular wheel in question. The shaft 114 is rotated about its axis to turn the associated fork and wheel by a rotary hydraulic actuator 116. As will be appreciated, the rotary actuator is operative to turn the fork 100 and the wheel 16 through 360° so that the machine, by proper coordination of the rotary actuators 116, is capable of steering in any direction. Shafts 110 and 114 are oriented with respect to the machine frame and one another to provide an appropriate camber angle for the wheel.

Referring to FIG. 5, the machine 10 is illustrated cutting a work face 150 through standing timber 152. The machine proceeds towards the work face at a speed up to one mile per hour. As the tracks 22 engage trees along the work face, the felling heads 28 are actuated to travel along the tracks 22 to engage trees, shear them and return them to the transfer mechanism 50 for loading onto bunk 14. During these operations, the operator need only be concerned with the speed of operation of the machine, this depending on the density of trees in the stand.

As illustrated in FIG. 5, the center track 22 is engaged with a tree 154 and has retracted with respect to the machine 10. The associated felling head 18 is illustrated as having travelled down the track 22 towards the tree 154. A plurality of felled trees 156 are illustrated at a position in bunk 14.

Once bunk 14 is full of trees, the grapple arms of the bunk are closed to bunch the trees, the weels 16 are turned through 90°, the fellers 20 and their associated transfer mechanism 50 are elevated to the transport positions illustrated in FIGS. 6 and 7 and in broken lines in FIG. 2, and the machine proceeds away from the work face to unload the trees in a bunch at a desired location.

Referring to FIGS. 8 and 9, there is illustrated an embodiment of the present invention comprising a harvester 200. The harvester 200 is mounted on a vehicle 202 of the articulated type. The vehicle has a forward section 204 with a pair of drive wheels 206, a cab 208 and an engine (not shown), and a rear section 210 articulately connected to the forward section 202 and having a pair of wheels 212. In the present embodiment, the feller is mounted on the rear section of the vehicle and consequently, in use, this rear section becomes the forward section.

Projecting from the rear section of the vehicle 202 is an automatic feller 214 of the same general configuration as the fellers 20 of the embodiment illustrated in FIGS. 1 through 7. This feller includes a pair of transversely spaced-apart longitudinally extending hydraulic actuators 216 fixed to the vehicle, a felling head track 218 extending across the ends of and mounted on the actuators 216, and a felling head 220 mounted on the track 218 for movement therealong. The operation of this feller is substantially the same as that illustrated in FIGS. 1 through 7 and consequently, this will not be described in detail.

This embodiment also includes a delimber assembly 230 mounted on the track 218 at the end thereof remote from the rest position of the felling head 220. The delimber assembly 230 includes a bracket 232 projecting rearwardly from the track 218, an upwardly extending arm 234 pivoted to the bracket 232 for pivotal movement about a transverse horizontal axis 236 and a delimber head 238 pivotally mounted on the top end of arm 234 for pivotal movement about a transverse horizontal axis 240. A hydraulic actuator (not shown) is provided to pivot arm 234 between a retracted position wherein the delimber head 238 is positioned behind the track 218 and a forward position illustrated in FIGS. 8 and 9 wherein the delimber projects forwardly from the track 218. Another hydraulic actuator (not shown) is provided for pivoting the delimber head 238 about the axis 240 between a tree receiving position illustrated in FIGS. 8 and 9 and a substantially horizontal delimbing position as illustrated in ghost lines in FIG. 9.

Delimber head 238 includes a stripper type delimber having knives 244 slidably mounted on a track 242 for movement therealong and a grapple 246 fixed to the track. This type of delimber operates by gripping a tree with the grapple, advancing the delimbing knives down the track and thereby along the tree to delimb a section thereof, opening the grapple, retracting the delimber down the track towards the grapple along with the delimb section of the tree and subsequently repeating the sequence until the tree is completely delimbed.

The initial operation of this embodiment is substantially the same as the operation of each feller 20 of the embodiment illustrated in FIGS. 1 through 7 until the tree is cut at the stump. In the present embodiment, the felling head 220, rather than returning to its rest position with the tree, proceeds down the track 218 until it reaches the delimber 230 which is, at this time, in its retracted position. The shear and grapple of the felling head moves upwardly during this movement. Upon arrival at the delimber 230, the delimber advances and grips the tree as shown in FIG. 9. At this time, the felling head 220 opens, the delimbing head 238 is then pivoted about axis 240 to the ghost line position illustrated in FIG. 9 and the delimber then proceeds to delimb the tree discharging it to the side of harvester 200. During this time the felling head unit returns to its normal position at the other end of the track.

It is to be understood that other embodiments, similar to that illustrated in FIGS. 8 and 9, may well include a topping mechanism in addition to the delimbing shear.

FIG. 9 illustrates a further feature that can be included in an embodiment of this type. In that drawing is illustrated a collecting arm 248 projecting from the side of the machine to which the delimbed trees are discharged. Arm 248 is illustrated, in FIG. 9, in a tree supporting position. It is also capable of pivoting downwardly to a position (not shown) for discharging trees supported thereon.

Mounted on the rear of the harvester 200 and projecting rearwardly therefrom is an arm 250 having pivoted to its free end a transverse clamping arm 252 which can be pivoted about a longitudinal axis 254.

With this arrangement, delimbed trees are discharged onto arm 248 and held in place by clamping arm 252 until a predetermined number of trees have been collected and processed. At that time, the arm 248 is lowered to drop the trees in a bunch at an appropriate position.

FIG. 10 illustrates a further embodiment of the present invention. This is a harvester 300 mounted, like the embodiment of FIGS. 8 and 9, on a skidder vehicle 302. In this embodiment, there is a fixed felling head track 304 extending transversely across the forward end of the vehicle 302. A carriage 306 rides along the track from end to end thereof. A felling head 308 is mounted on the carriage by means of a vertical arm 310 pivoted to the carriage 306 for movement about the horizontal transverse axis 312, between a vertical limiting position and a horizontal limiting position. The felling head 308 is arranged to pivot about a vertical axis 314 between a forwardly opening at rest position and the sideways felling position illustrated in FIG. 10.

The sensing means of the embodiment illustrated in FIG. 10 comprises a pair of arms 316 projecting forwardly from opposite ends of the track 304, a light source 318 carried by one of the arms and a photoelectric sensor on the other, receiving light from the source 318.

Also illustrated in FIG. 10 is a delimber unit 322 carried on the end of the track 304, remote from the at rest position of the felling head 308 and extending rearwardly from the track 304.

In operation, the harvester proceeds towards a tree which intercepts the light beam from source 318 falling on sensor 320. This actuates the felling head 308 to pivot 90° to the position illustrated in FIG. 10, and the carriage 306 to travel down track 304. The felling head then engages the tree, severs it and continues to the end of track 304 with the tree. At this point, the felling head arm 310 pivots about the axis 312 to place the tree in the delimber 322 for processing.

In the various embodiments illustrated, it is desirable that the fellers not be actuated by a tree under a certain predetermined size. With the embodiments of FIGS. 1 through 7 and FIGS. 8 and 9, this is accomplished by arranging the felling head tracks to retract only upon the application of a predetermined force. Thus, the machine will pass over a tree of, for example, less than three inch diameter. With the photoelectric embodiment, the width of the light beam sensed and the sensitivity of the photoelectric sensors can be appropriately adjusted for this purpose.

While certain embodiments of the present invention have been described, it is to be understood that various other embodiments of the present invention can be constructed as well. For example, embodiments of the present invention may be provided that are simply fellers and that do not provide a forwarding or processing function. In yet another embodiment, a plurality of felling heads are mounted on an endless track and driven thereabout by an endless conveyor, thus avoiding the time delay involved in returning the felling heads to their at rest positions after a tree has been felled.

I claim:

1. Tree felling apparatus comprising:
   a. a mobile vehicle;
   b. sensing means on said vehicle for sensing the presence of a standing tree at the forward end of said vehicle as said vehicle moves in a forward direction;
   c. felling means movably mounted on said vehicle;
   d. means operable in response to sensing of a tree by said sensing means to move said felling means into engagement with the tree sensed by said sensing means; and
   e. means for operating said felling means to fell a tree in response to engagement of said felling means with said tree.

2. Apparatus as defined in claim 1 wherein said felling means comprise a felling head and said means for operating said felling means comprise means for operating said felling head to grapple and fell a tree.

3. Apparatus as defined in claim 2 further comprising a bunk mounted on said vehicle for holding felled trees.

4. Apparatus as defined in claim 3 further comprising transfer means mounted on said vehicle for transferring trees from said felling head to said bunk.

5. Apparatus as defined in claim 1 and further including delimbing means mounted on said vehicle to receive and delimb trees severed from their stumps by said felling means.

6. Apparatus as defined in claim 1 wherein said sensing means comprise photoelectric means.

7. Apparatus as defined in claim 1 wherein said sensing means are operative exclusively to sense trees larger than a predetermined size.

8. A tree felling apparatus comprising:
   a. a mobile vehicle;
   b. a plurality of tree felling heads mounted on said vehicle for movement relative thereto in at least a direction transverse to the normal forward direction of travel of the vehicle and normally located at respective positions spaced apart from one another transversely of the vehicle;
   c. sensing means associated with respective ones of the felling heads for sensing the presence of a standing tree at the forward end of the vehicle as the vehicle moves in the forward direction; and
   d. means actuated by said sensing means causing a felling head associated with such sensing means to move on the vehicle to a position adjacent the sensed tree for embracing the same.

9. Apparatus as defined in claim 8 including a transfer grapple mounted on the vehicle and arranged for moving trees from the felling heads to another position on the vehicle.

10. Apparatus as defined in claim 9 including a bunk mounted on said vehicle for receiving trees from said transfer grapple.

11. Apparatus as defined in claim 8 wherein each said sensing means comprises a sensing member mounted on said vehicle at the forward end thereof and extending partially transversely thereacross for engagement with trees as said vehicle moves in a forward direction.

12. Apparatus as defined in claim 11 wherein said felling heads are reciprocally mounted on respective ones of the sensing members for movement therealong.

13. Apparatus as defined in claim 10 wherein said bunk is pivotally mounted on said vehicle for pivotal movement about a substantially vertical axis.

14. Apparatus as defined in claim 13 wherein said vehicle is supported upon a plurality of wheel units each of which is pivotable about a vertical axis to steer the vehicle so as to be movable in either a forward-rearward direction or in a sideways direction.

15. Apparatus as defined in claim 9 wherein said transfer grapple is mounted on the free end of an arm swingably mounted on said vehicle.

16. Apparatus as defined in claim 15 wherein there is a transfer grapple associated with respective ones of each of the plurality of felling heads.

17. Tree felling apparatus comprising:
   a. a mobile, self-propelled vehicle;
   b. at least one horizontally disposed track mounted on said vehicle and projecting forwardly therefrom, said track having at least a major portion thereof extending transversely to the direction of travel of the vehicle when felling trees;
   c. a felling head slidably mounted on said track for reciprocal movement therealong;
   d. means on said vehicle for sensing a growing tree in the path of travel of the track during forward movement of the vehicle; and
   e. means actuated by said sensing means to move the felling head on said track to the tree sensed by the sensing means for felling the same.

18. A tree felling apparatus as defined in claim 17 including means retractably mounting said track on said vehicle permitting the vehicle to move continuously forwardly during felling of a tree.

19. A tree felling apparatus as defined in claim 17 wherein said track has an end portion curving rearwardly toward the vehicle.

* * * * *